US011916296B2

(12) United States Patent
Miki et al.

(10) Patent No.: US 11,916,296 B2
(45) Date of Patent: Feb. 27, 2024

(54) ANTENNA DEVICE FOR MOBILE BODY AND COMMUNICATION DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yutaro Miki, Osaka (JP); Suguru Yamagishi, Osaka (JP); Takanori Fukunaga, Osaka (JP); Ichiro Kuwayama, Osaka (JP); Toyohisa Takano, Osaka (JP); Hiroki Hirai, Yokkaichi (JP); Norichika Oomi, Yokkaichi (JP); Kosuke Sone, Yokkaichi (JP); Yasuyuki Yamamoto, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 7 days.

(21) Appl. No.: 17/437,435

(22) PCT Filed: Jan. 29, 2020

(86) PCT No.: PCT/JP2020/003125
§ 371 (c)(1),
(2) Date: Sep. 9, 2021

(87) PCT Pub. No.: WO2020/189033
PCT Pub. Date: Sep. 24, 2020

(65) Prior Publication Data

US 2022/0173524 A1 Jun. 2, 2022

(30) Foreign Application Priority Data

Mar. 18, 2019 (JP) ................................ 2019-050392

(51) Int. Cl.
*H01Q 19/12* (2006.01)
*H01Q 1/22* (2006.01)
(Continued)

(52) U.S. Cl.
CPC ............... *H01Q 19/12* (2013.01); *H01Q 1/22* (2013.01); *H01Q 3/24* (2013.01); *H01Q 3/30* (2013.01)

(58) Field of Classification Search
CPC .......... H01Q 1/32; H01Q 1/3275; H01Q 1/22; H01Q 3/24; H01Q 3/30; H01Q 19/12;
(Continued)

(56) References Cited

U.S. PATENT DOCUMENTS

2016/0359237 A1 12/2016 Quan et al.

FOREIGN PATENT DOCUMENTS

DE 2054621 A1 6/1972
JP H11-225013 A 8/1999
(Continued)

*Primary Examiner* — Hoang V Nguyen
(74) *Attorney, Agent, or Firm* — XSENSUS LLP

(57) ABSTRACT

An antenna device, for a mobile body, of this disclosure includes an antenna configured to be installed in the mobile body, and a reflector having a reflection surface configured to change a beam direction of the antenna.

13 Claims, 16 Drawing Sheets

(51) Int. Cl.
*H01Q 3/24* (2006.01)
*H01Q 3/30* (2006.01)

(58) Field of Classification Search
CPC ...... H01Q 19/17; H01Q 21/08; H01Q 21/065; H01Q 21/205
See application file for complete search history.

(56) References Cited

FOREIGN PATENT DOCUMENTS

| | | | | | |
|---|---|---|---|---|---|
| JP | H11-308042 | A | | 11/1999 | |
| JP | 2000-353914 | A | | 12/2000 | |
| JP | 2014165754 | A | * | 9/2014 | ............... H01Q 3/20 |
| JP | 2017-34644 | A | | 2/2017 | |
| TW | 201739106 | A | | 11/2017 | |
| WO | 2015/120417 | A2 | | 8/2015 | |
| WO | 2018/088051 | A1 | | 5/2018 | |

* cited by examiner

ANTENNA DEVICE FOR MOBILE BODY AND COMMUNICATION DEVICE

CROSS-REFERENCE TO RELATED APPLICATIONS

The present application is based on PCT filing PCT/JP2020/003125, filed Jan. 29, 2020, which claims priority to Japanese Patent Application No. 2019-050392 filed on Mar. 18, 2019, the entire contents of each are incorporated herein by reference.

TECHNICAL FIELD

The present disclosure relates to an antenna device for a mobile body, and a communication device.

BACKGROUND ART

PATENT LITERATURE 1 discloses an antenna device installed in a vehicle.

CITATION LIST

Patent Literature

PATENT LITERATURE 1: International Publication No. WO2018/088051

SUMMARY OF INVENTION

An aspect of the present disclosure is an antenna device. An antenna device of the present disclosure includes: an antenna configured to be installed in a mobile body; and a reflector having a reflection surface configured to change a beam direction of the antenna.

Another aspect of the present disclosure is a communication device. The communication device of the present disclosure includes: an antenna configured to be installed in a mobile body; a reflector having a reflection surface configured to change a beam direction of the antenna; and a wireless circuit configured to be connected to the antenna.

DESCRIPTION OF EMBODIMENTS

Figure 1:
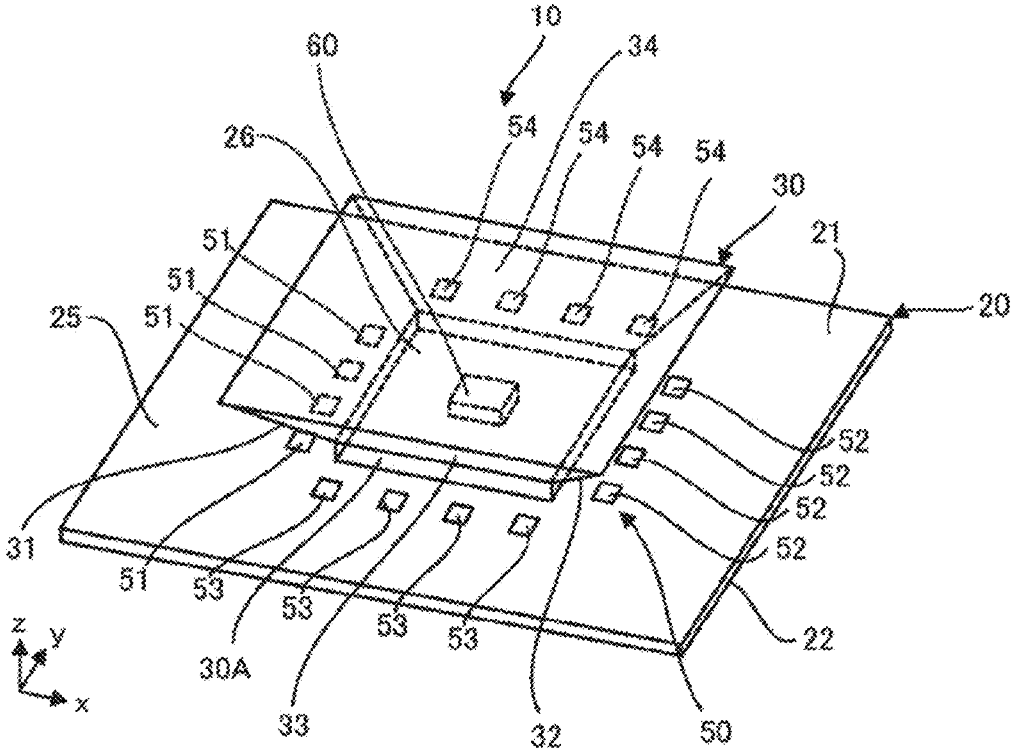
FIG. 1 is a perspective view of an antenna device according to a first embodiment.

Problems to be Solved by the Present Disclosure

An antenna needs to be installed such that a beam is directed to a communication counterpart. However, a mobile body such as a vehicle has restrictions in terms of appearance design or the form of the place where the antenna can be installed. Therefore, in some cases, it is difficult to install the antenna such that the beam is directed to the communication counterpart.

For example, the roof of a vehicle is, in general, a plate-like structure body having a horizontal plane. In order to obtain a beam in a substantially horizontal direction by an antenna installed in such a roof, an antenna face that forms a beam needs to be perpendicularly set. In this case, the antenna device protrudes from the roof of the vehicle upwardly. This causes a protruding portion to be present in the roof of the vehicle, and this influences the appearance design of the vehicle. Meanwhile, when the influence on the appearance design of the vehicle is to be suppressed, antenna characteristics are sacrificed such as in a case where a beam directed to the communication counterpart cannot be obtained. Thus, the antenna device to be installed in a mobile body has a low degree of freedom in designing.

Therefore, it is desired that, even when there are restrictions in terms of appearance design or the form of the place where an antenna can be installed, the beam can be directed toward a communication counterpart and decrease in the degree of freedom in designing can be suppressed.

According to the present disclosure, even when there are restrictions in terms of appearance design or the form of the place where an antenna can be installed, the beam can be directed toward a communication counterpart and decrease in the degree of freedom in designing can be suppressed.

Description of Embodiments of the Present Disclosure (1) An antenna device according to an embodiment includes: an antenna configured to be installed in a mobile body; and a reflector having a reflection surface configured to change a beam direction of the antenna. The beam direction of the antenna can be changed by the reflector. Therefore, even when there are restrictions in terms of appearance design or the form of the place where the antenna can be installed, the beam can be directed to the communication counterpart.

(2) The antenna may include
- one or a plurality of first antenna elements configured to generate a first beam, and
- one or a plurality of second antenna elements configured to generate a second beam, and
- the reflection surface includes
- a first reflection region configured to direct the first beam toward a first direction, and a second reflection region configured to direct the second beam toward a second direction different from the first direction. In this case, the beam can be directed to a plurality of directions including the first direction and the second direction. The antenna device may be able to direct the beam toward a direction other than the first direction and the second direction in addition to the first direction and the second direction.

(3) Preferably, the first antenna element and the second antenna element are disposed such that the first beam and the second beam are directed toward a same direction between the antenna and the reflector. In this case, production of the antenna is facilitated.

(4) Preferably, the first antenna element and the second antenna element are provided at a same base member. In this case, a configuration in which a plurality of antenna elements are disposed so as to be integrated in the same base member can be obtained.

(5) Preferably, the first antenna element and the second antenna element are provided at a same surface of the base member. The antenna elements provided at the same surface are advantageous in obtaining a compact antenna.

(6) Preferably, the first antenna element and the second antenna element are provided at a same flat surface of the base member. In this case, a more compact antenna can be obtained.

(7) Preferably, the first antenna element and the second antenna element are disposed such that the first beam and the second beam are directed toward an upward direction between the antenna and the reflector, and the first direction and the second direction are each a direction inclined closer to a horizontal direction than to the upward direction. In this case, even when an antenna element is disposed such that the beam is directed toward the upward direction, the beam can be directed toward the communication counterpart that is in a direction inclined closer to the horizontal direction than to the upward direction.

(8) Preferably, the first direction and the second direction are each a direction between the horizontal direction and the upward direction. In this case, the beam can be directed toward the communication counterpart that is present in an obliquely upward direction.

(9) Preferably, the first direction and the second direction are different directions at a horizontal plane. In this case, the beam can be directed toward different directions at the horizontal plane.

(10) Preferably, the first direction and the second direction are the same direction at a vertical plane. In this case, the directions of the beams at the vertical plane can be caused to match each other.

(11) Preferably, the reflection surface has a concave curved surface region. In this case, the gain can be increased.

(12) Preferably, the reflection surface has a parabolic curved surface region. Preferably, in the parabolic curved surface region, a cross-sectional shape at an orthogonal plane with respect to a surface provided with the antenna is a parabola, and a cross-sectional shape at a plane parallel to the surface provided with the antenna is a straight line. In this case, the gain can be more increased.

(13) Preferably, the antenna and the reflector are provided at a base member, and the base member is provided with a wireless circuit configured to be connected to the antenna. In this case, the antenna device and the wireless circuit can be integrated.

(14) Preferably, the reflector has an internal space, and the wireless circuit is disposed in the internal space. In this case, the internal space of the reflector can be effectively utilized as a disposition region of a wireless circuit.

(15) A communication device of the embodiment includes: an antenna configured to be installed in a mobile body; a reflector having a reflection surface configured to change a beam direction of the antenna; and a wireless circuit configured to be connected to the antenna.

DETAILS OF EMBODIMENTS OF THE PRESENT DISCLOSURE

First Embodiment

Figure 2:
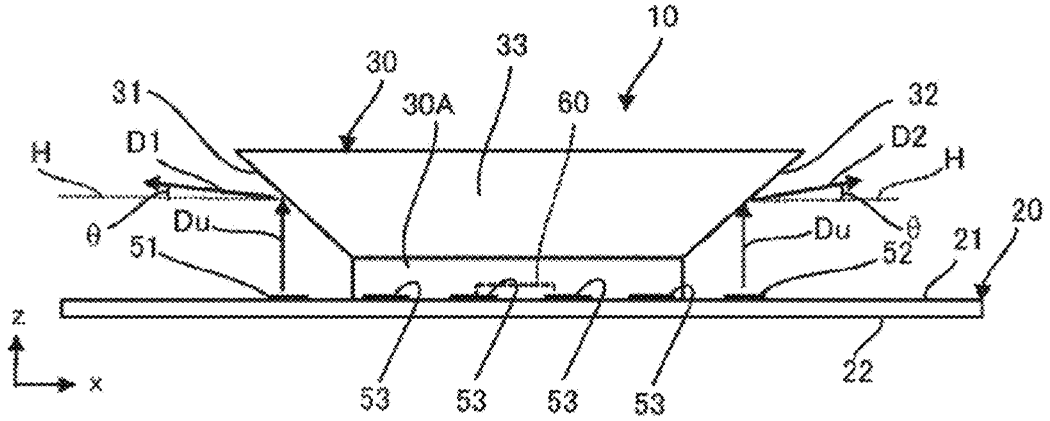
FIG. 2 is a side view of the antenna device according to the first embodiment.
Figure 3:
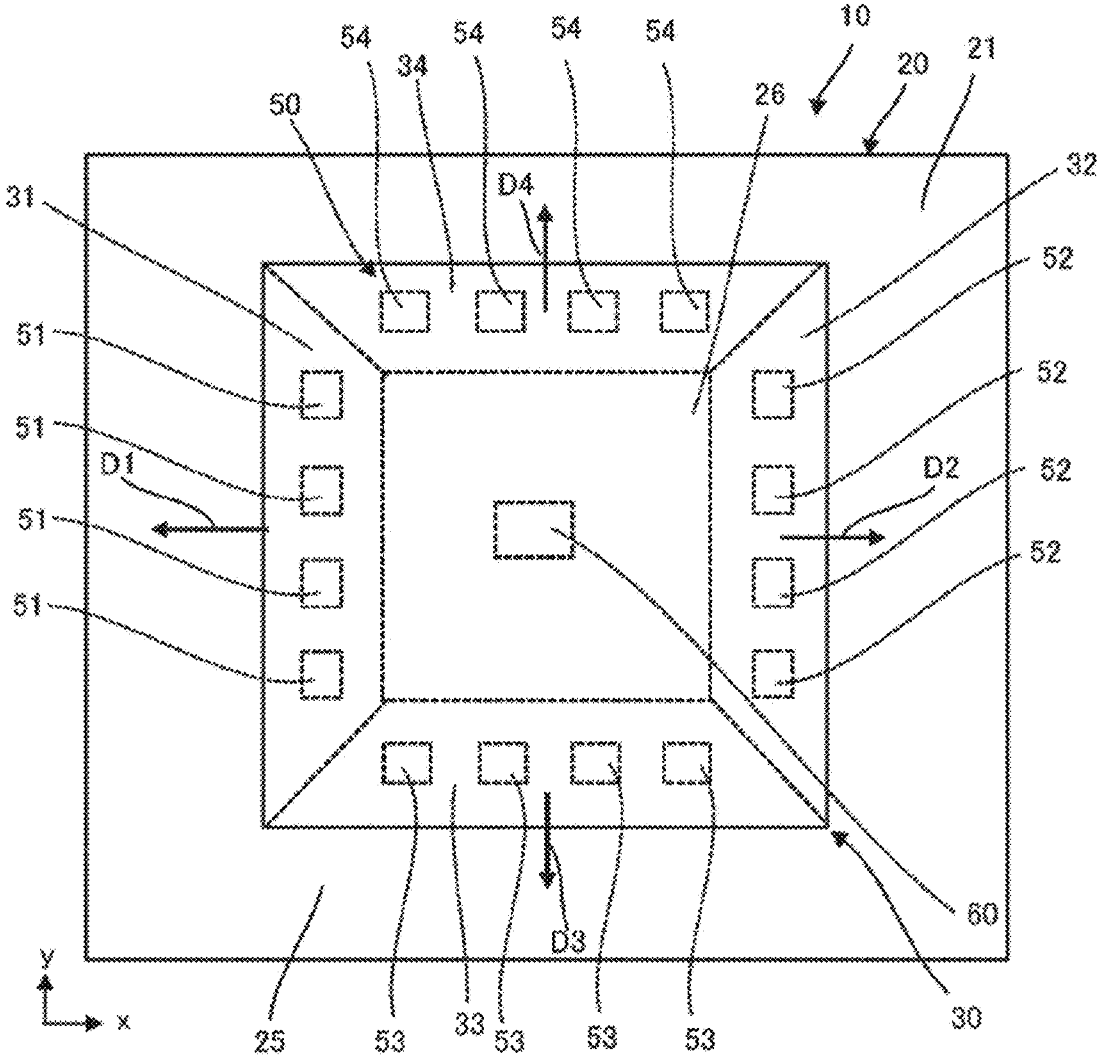
FIG. 3 is a plan view of the antenna device according to the first embodiment.

FIG. 1, FIG. 2, and FIG. 3 each show an antenna device 10, for a mobile body, according to a first embodiment. The mobile body antenna device 10 includes an antenna 50. The antenna 50 is installed in a mobile body of a vehicle or the like. The vehicle is an automobile, a train, a watercraft, or a flying body, for example. The antenna 50 of this embodiment is a patch antenna provided on a substrate (base member) 20. The patch antenna includes antenna elements (patch elements) 51, 52, 53 and 54 formed on the substrate 20. The substrate 20 is a dielectric substrate. The antenna elements 51, 52, 53 and 54 are formed on an upper surface 21 (first surface; flat surface) of the substrate 20. A conductor layer serving as a ground surface is formed on a lower surface 22 (second surface; flat surface) of the substrate 20. The substrate 20 of the patch antenna may have a single layer structure as shown, but, not limited thereto, may have a multi-layer structure of two layers or more. For example, a substrate of a two-layer structure having a first dielectric layer and a second dielectric layer can be adopted. When a substrate of a two-layer structure is used, for example, a ground is formed on the surface of the first dielectric layer on the side opposite to the second dielectric layer, patch elements fed with power are formed between the first dielectric layer and the second dielectric layer, and patch elements not fed with power are formed on the surface of the second dielectric layer on the side opposite to the first dielectric layer. The antenna 50 is not limited to a patch antenna, and may be a slot antenna, for example.

In the following description, the left-right direction in the substrate upper surface 21 shown in FIG. 2 and FIG. 3 is defined as x, the direction orthogonal to x in the upper surface 21 is defined as y, and the direction orthogonal to the xy plane is defined as z. In a state of the antenna 50 being installed in a mobile body such as a vehicle, the xy plane is a horizontal plane, for example. In FIG. 3, the leftward direction is defined as −x direction, and the rightward direction is defined as +x direction. In FIG. 3, the downward direction is defined as −y direction, and the upward direction is defined as +y direction.

In the first embodiment, the antenna 50 has a plurality of antenna element groups. The plurality of antenna element groups are four groups, for example. A first group is composed of a plurality of (four) first antenna elements 51. A second group is composed of a plurality of (four) second antenna elements 52. A third group is composed of a plurality of (four) third antenna elements 53. A fourth group is composed of a plurality of (four) fourth antenna elements 54. That is, the antenna 50 of this embodiment has 16 antenna elements 51, 52, 53 and 54.

The plurality of (16) antenna elements 51, 52, 53 and 54 are disposed in a rectangular peripheral shape so as to form four sides of a rectangle. That is, the first group of the first antenna elements 51 forms a first side of the rectangle. The second group of the second antenna elements 52 forms a second side, which is the opposing side of the first side. Further, the third group of the third antenna elements 53 forms a third side orthogonal to the first side and the second side. The fourth group of the fourth antenna elements 54 forms a fourth side, which is the opposing side of the third side.

Since the antenna elements 51, 52, 53 and 54 are provided at the substrate upper surface 21, which is a horizontal plane, each antenna element 51, 52, 53 and 54 forms a beam directed to an upward direction Du (see FIG. 2).

The mobile body antenna device 10 includes a reflector 30. The reflector 30 is made of metal, for example, and reflects radio waves. The reflector 30 is provided at the upper surface 21 of the substrate 20. The reflector 30 is provided so as to stand in a region (rectangular region) surrounded by the plurality of antenna elements 51, 52, 53 and 54.

The reflector 30 includes a base part 30A mounted to the substrate 20, and reflection surfaces (reflection regions) 31, 32, 33 and 34 provided above the base part 30A. The base part 30A is formed as a frame body having a rectangular shape. The reflection surfaces have a plurality of reflection regions 31, 32, 33 and 34 that are extended obliquely upward from the respective four sides of the base part 30A having a rectangular shape. The shown reflection regions 31, 32, 33 and 34 are flat surfaces, respectively, and are disposed so as to form four pyramidal faces of a truncated quadrangular pyramid. The truncated quadrangular pyramid here is an inverted truncated quadrangular pyramid in which the bottom surface that has a smaller area is on the lower side and the bottom surface that has a larger area is on the upper side. The inside of the reflector 30 is hollow.

The plurality of reflection regions 31, 32, 33 and 34 include a first reflection region (first reflection surface) 31. As shown in FIG. 2, the first reflection region 31 is positioned above each first antenna element 51. The first reflection region 31 directs a first beam in the upward direction Du generated from the first antenna element 51, toward a first direction D1. As shown in FIG. 2, the first direction D1 is substantially horizontal (in FIG. 2, the elevation with respect to a horizontal plane H is 10°), and is in the −x direction as shown in FIG. 3.

The plurality of reflection regions 31, 32, 33 and 34 include a second reflection region (second reflection surface) 32. The second reflection region 32 is positioned above each second antenna element 52. The second reflection region 32 directs a second beam in the upward direction Du generated from the second antenna element 52, toward a second direction D2. As shown in FIG. 2, the second direction D2 is substantially horizontal (the elevation is 10°) and is in the +x direction as shown in FIG. 3.

The plurality of reflection regions 31, 32, 33 and 34 include a third reflection region (third reflection surface) 33. The third reflection region 33 is positioned above each third antenna element 53. The third reflection region 33 directs a third beam in the upward direction Du generated from the third antenna element 53, toward a third direction D3. The third direction D3 is substantially horizontal (the elevation is 10°), and is in the −y direction as shown in FIG. 3.

The plurality of reflection regions 31, 32, 33 and 34 include a fourth reflection region (fourth reflection surface) 34. The fourth reflection region 34 is positioned above each fourth antenna element 54. The fourth reflection region 34 directs a fourth beam in the upward direction Du generated from the fourth antenna element 54, toward a fourth direction D4. The fourth direction D4 is substantially horizontal (the elevation is 10°) and is in the +y direction as shown in FIG. 3.

As described above, the reflector 30 directs the first beam toward the first direction D1, directs the second beam toward the second direction D2, directs the third beam toward the third direction D3, and directs the fourth beam toward the fourth direction D4. Each direction D1, D2, D3 and D4 is a direction inclined closer to the horizontal direction H than to the upward direction Du. Therefore, even when the disposition of the antenna 50 itself is a disposition in which beams generated from the plurality of antenna elements 51, 52, 53 and 54 are all directed toward the same upward direction Du, the reflector 30 allows obtainment of beams that are directed toward directions inclined closer to the horizontal direction H than to the upward direction Du. Therefore, beam directivity suitable for communication with a communication counterpart that is present in a direction other than the upward direction Du can be obtained.

In the embodiment, beams respectively directed to the plurality of directions D1, D2, D3 and D4 can be obtained due to the reflector 30. Therefore, the plurality of antenna elements 51, 52, 53 and 54 may be disposed so as to generate beams that are all directed to the same direction Du. That is, the plurality of antenna elements 51, 52, 53 and 54 are disposed such that the respective beams are directed toward the same direction Du between the antenna 50 and the reflector 30. Therefore, this embodiment realizes a configuration in which the plurality of antenna elements 51, 52, 53 and 54 for the different directions D1, D2, D3 and D4 are disposed so as to be integrated in the same base member (substrate) 20.

In particular, in the embodiment, it is realized that the plurality of antenna elements 51, 52, 53 and 54 for the different directions D1, D2, D3 and D4 are provided at the same surface, i.e., the substrate upper surface 21. The antenna elements 51, 52, 53 and 54 provided at the same surface are advantageous in obtaining a compact antenna 50.

In addition, since the substrate upper surface 21 is a flat surface, it is realized that the plurality of antenna elements 51, 52, 53 and 54 for the different directions D1, D2, D3 and D4 are provided at the same flat surface, i.e., the substrate upper surface 21. The antenna elements 51, 52, 53 and 54 provided at the same flat surface are advantageous in obtaining a more compact antenna 50.

In the embodiment, the first direction D1, the second direction D2, the third direction D3, and the fourth direction D4 are directions that are all different at the horizontal plane H (the xy plane). Therefore, as the entirety of the antenna device 10, a wide directivity at the horizontal plane can be ensured.

In the embodiment, the inclination angles of the respective reflection regions 31, 32, 33 and 34 are set to be equivalent to each other such that the angles (e.g., elevation) θ of the first direction D1, the second direction D2, the third direction D3, and the fourth direction D4 with respect to the horizontal plane H (the xy plane) are equivalent to each other. Therefore, regardless of the directions D1, D2, D3 and D4 in the horizontal plane, the beam angles θ with respect to the horizontal plane H can be caused to match each other. Here, "the angles are equivalent" is not limited to a complete sameness of angles but includes a substantial sameness of angles. The substantial sameness of angles means the sameness of angles to an extent that the angles can be regarded as the same, when viewed as beam angles. For example, an angle difference caused by a production error does not inhibit the beam angles from being regarded as being the same. An angle difference that is allowable for specifications of an antenna does not inhibit the beam angles from being regarded as being the same. That is, within a predetermined angle range allowable from a certain viewpoint, the angles can be regarded as being equivalent.

When the reflector 30 is formed as an integrally molded article, it is easy to cause the angles θ of the respective directions D1, D2, D3 and D4 with respect to the horizontal plane H to match each other.

Further, in the embodiment, the first direction D1, the second direction D2, the third direction D3, and the fourth direction D4 each have an elevation of 10°, and are directions between the horizontal plane direction H and the upward direction Du. Therefore, the antenna device 10 of the embodiment is suitable for communication with a communication counterpart that is present in an obliquely upward direction. The communication counterpart that is present in an obliquely upward direction is, for example, a wireless base station provided at a high place such as a rooftop of a building or a steel tower.

As mentioned above, the reflector 30 of the embodiment is hollow. That is, the reflector 30 has an internal space surrounded by the base part 30A and the reflection regions 31, 32, 33 and 34. The reflector 30 provided at the upper surface 21 of the substrate 20 sections the upper surface 21 into a reflector outer region 25 and a reflector inner region 26. The reflector outer region 25 is an antenna element disposition region where the plurality of antenna elements 51, 52, 53 and 54 are disposed. The reflector inner region 26 is a circuit disposition region where a wireless circuit 60 connected to the antenna 50 is disposed.

In the inner region 26 used as a circuit disposition region of the substrate 20, elements (e.g., integrated circuit) of a wireless circuit 60 including a transmitter-receiver are provided. That is, inside the reflector 30, elements of the wireless circuit 60 are provided. Since the elements of the wireless circuit 60 are provided inside the reflector 30, the space of the substrate 20 can be effectively utilized. The inside of the reflector 30 is less likely to be influenced by a radio wave, and thus, is suitable for the space where the wireless circuit 60 is disposed.

Figure 4:
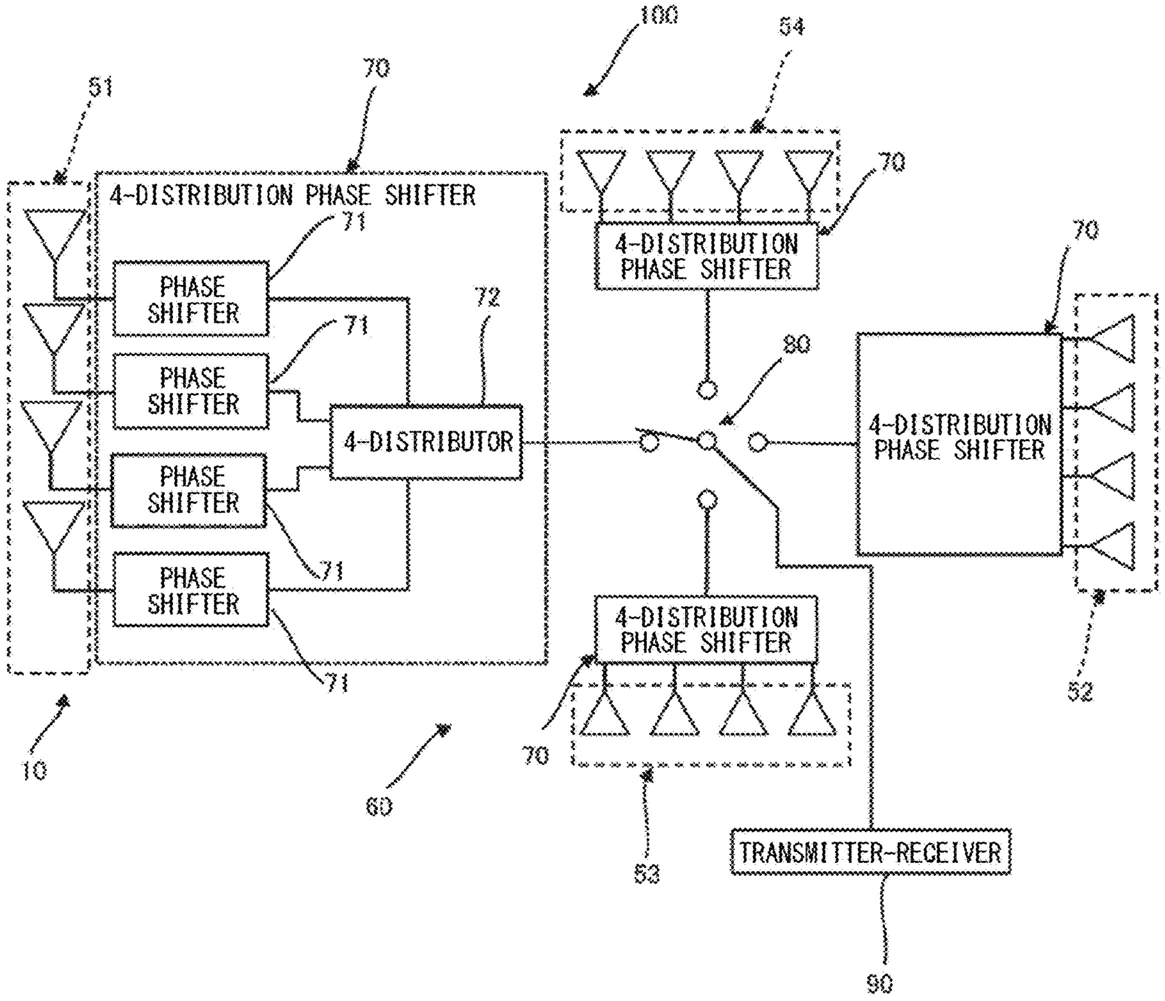
FIG. 4 is a circuit diagram of a communication device.

FIG. 4 shows a communication device 100 that includes: the antenna device 10 including the plurality of antenna elements 51, 52, 53 and 54; and the wireless circuit 60 connected to the antenna device 10. In the present embodiment, the wireless circuit 60 is provided in the antenna device 10.

The wireless circuit 60 includes a 4-distribution phase shifter 70 connected to the four first antenna elements 51, a 4-distribution phase shifter 70 connected to the four second antenna elements 52, a 4-distribution phase shifter 70 connected to the four third antenna elements 53, and a 4-distribution phase shifter 70 connected to the four fourth antenna elements 54. The plurality of 4-distribution phase shifters 70 are connected to a transmitter-receiver 90 via a selector 80.

Each 4-distribution phase shifter 70 includes a 4-distributor 72, and phase shifters 71 provided between the 4-distributor 72 and the antenna elements. The phase shifter 71 enables, for example, beam steering (beam forming) in which the direction of the beam at the horizontal plane is changed.

The selector 80 connects the transmitter-receiver 90 to any one of the plurality of 4-distribution phase shifters 70. Antenna elements that are used in communication are antenna elements that are connected to the transmitter-receiver 90 via the selector 80. When the selector 80 is switched in accordance with the direction in which the communication counterpart is present, antenna elements (active antenna elements) that are used in communication are switched. Therefore, even when the orientation of the mobile body has been changed, the beam can be formed in the direction in which the communication counterpart is present. For example, even when the relative positional relationship between the mobile body and the communication counterpart has been changed in accordance with movement of the mobile body, a state where the beam is directed to the communication counterpart can be maintained.

Figure 5:
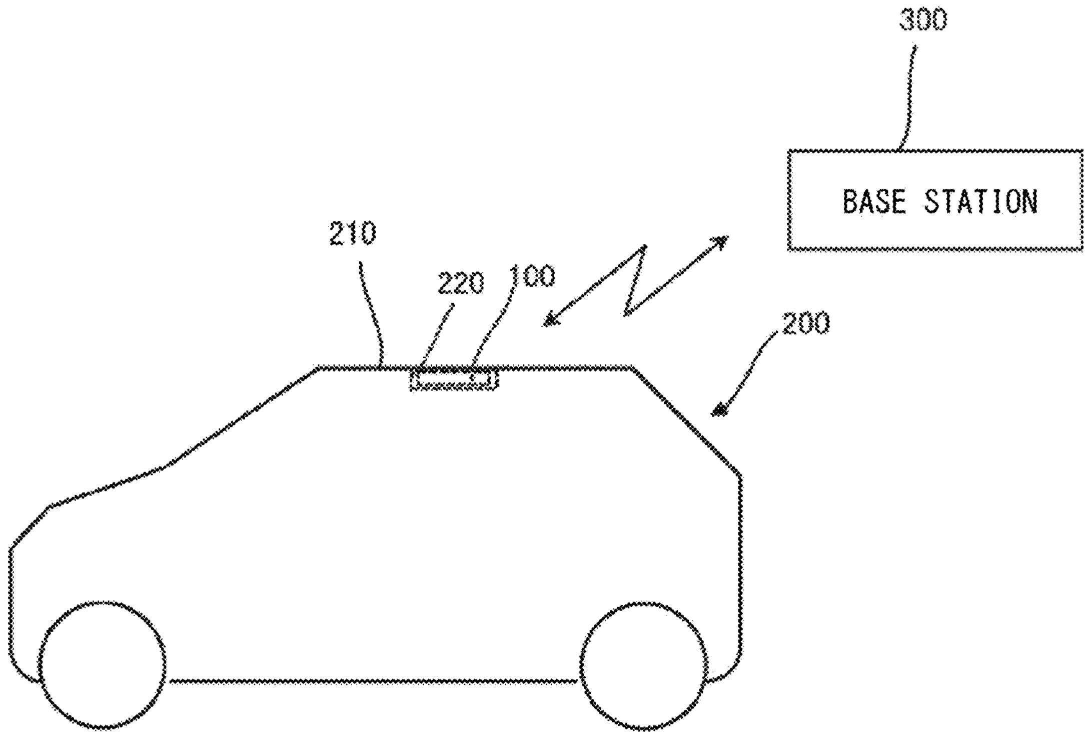
FIG. 5 is a schematic diagram of a vehicle having the communication device installed therein.

FIG. 5 shows an example in which the communication device 100 is installed in a vehicle 200. The communication device 100 is configured as a mobile station that performs communication with a wireless base station 300. In FIG. 5, the communication device 100 is installed in a roof 210. The roof 210 is a plate-like structure body. The roof 210 has formed therein a recess 220 for housing the communication device 100. The communication device 100 is disposed in the recess 220. The communication device 100 is set in the roof 210 such that the substrate 20 is placed horizontally and the substrate upper surface 21 is oriented upward. As for the antenna device 10 of the present embodiment, even when the antenna 50 itself is oriented upward, the beam directed obliquely upward is formed by the reflector 30, and thus, communication with a communication counterpart such as the base station 300 provided in an obliquely upward direction can be performed. Since the antenna device 10 of the present embodiment is allowed to have a small height due to the reflector 30, even when the antenna device 10 is installed in the roof 210, the antenna device 10 does not protrude from the roof 210, or if the antenna device 10 does protrude, the protrusion amount can be a very small amount. Therefore, influence on appearance design can be suppressed.

Second Embodiment

Figure 6:
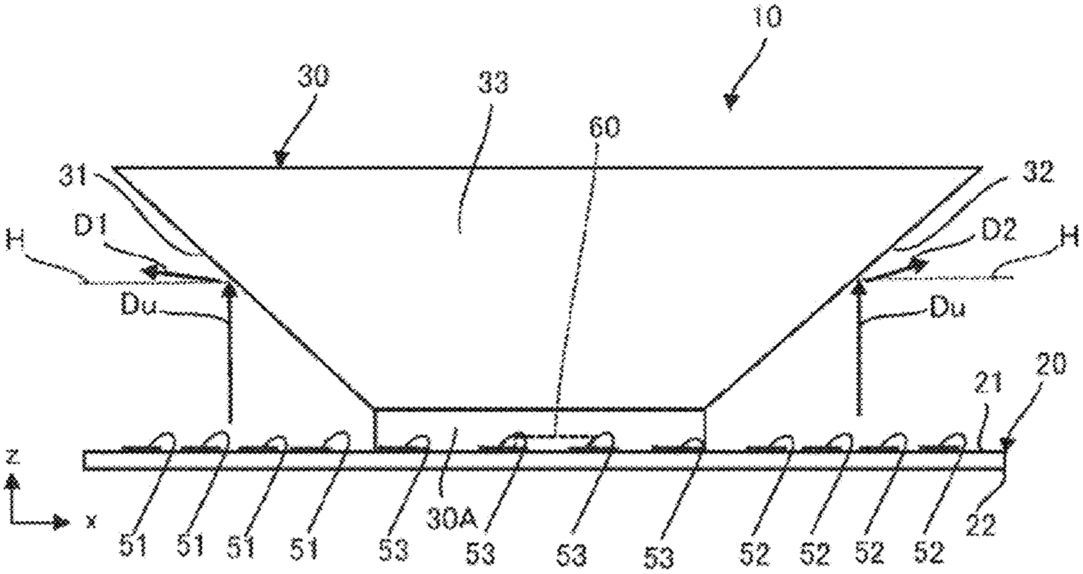
FIG. 6 is a side view of an antenna device according to a second embodiment.
Figure 7:
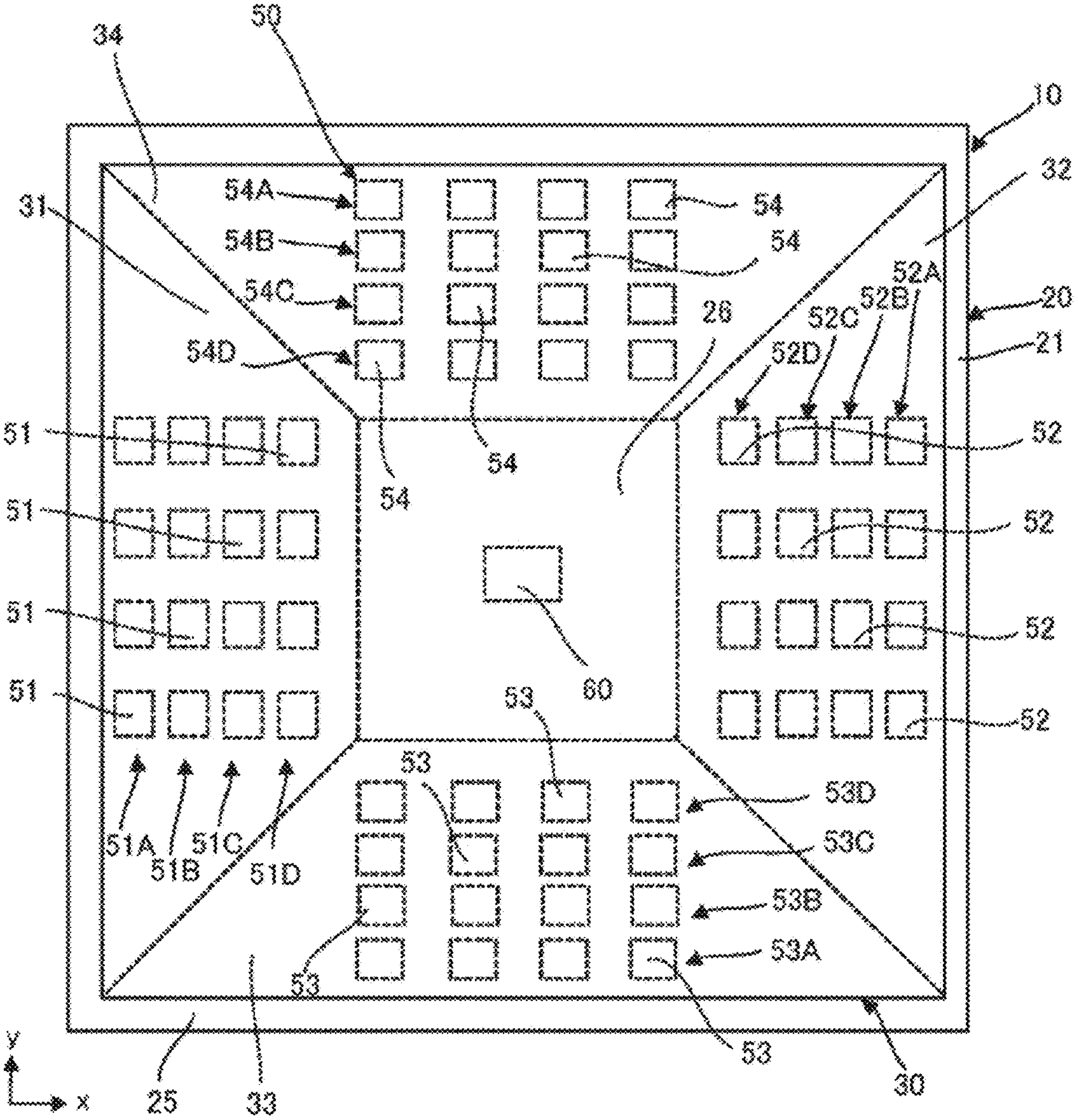
FIG. 7 is a plan view of the antenna device according to the second embodiment.

FIG. 6 and FIG. 7 each show an antenna device 10, for a mobile body, according to a second embodiment. In the second embodiment and thereafter, contents that are not descried in particular are the same as those in the first embodiment.

In the second embodiment, each of a plurality of antenna element groups has a plurality of rows of antenna elements. Meanwhile, in the first embodiment, each of the plurality of antenna element groups is composed of one row of antenna elements. That is, in the first embodiment, the first group is formed by four first antenna elements 51 being disposed in one row. Similarly, the second group is formed by four second antenna elements 52 being disposed in one row, the third group is formed by four third antenna elements 53 being disposed in one row, and the fourth group is formed by four fourth antenna elements 54 being disposed in one row. In the first embodiment, the longitudinal direction of the row of each group is a direction orthogonal to the direction of the beam generated by each antenna element belonging to the group. For example, the longitudinal direction of the row of the first antenna elements 51 is the y direction orthogonal to the first direction D1 (−x) in which the first beam is directed.

In the second embodiment, a first group of the first antenna elements 51 has a plurality of (four) rows 51A, 51B, 51C and 51D. Each row 51A, 51B, 51C and 51D has four antenna elements 51. The arrangement direction of the plurality of rows 51A, 51B, 51C and 51D is a direction (the x direction) obtained by projecting the first direction D1 in which the first beam is directed, onto the horizontal plane (the xy plane). When the phase is adjusted for each of the plurality of rows 51A, 51B, 51C and 51D, beam forming in which the direction of the first beam at the vertical plane is changed can be performed.

Similarly, a second group of the second antenna elements 52 has a plurality of (four) rows 52A, 52B, 52C and 52D. Each row 52A, 52B, 52C and 52D has four antenna elements 52. The arrangement direction of the plurality of rows 52A, 52B, 52C and 52D is a direction (the x direction) obtained by projecting the second direction D2 in which the second beam is directed, onto the horizontal plane (the xy plane). When the phase is adjusted for each of the plurality of rows 52A, 52B, 52C and 52D, beam forming in which the direction of the second beam at the vertical plane is changed can be performed.

A third group of the third antenna elements 53 has a plurality of (four) rows 53A, 53B, 53C and 53D. Each row 53A, 53B, 53C and 53D has four antenna elements 53. The arrangement direction of the plurality of rows 53A, 53B, 53C and 53D is a direction (the y direction) obtained by projecting the third direction D3 in which the third beam is directed, onto the horizontal plane (the xy plane). When the phase is adjusted for each of the plurality of rows 53A, 53B, 53C and 53D, beam forming in which the direction of the third beam at the vertical plane is changed can be performed.

A fourth group of the fourth antenna elements 54 has a plurality of (four) rows 54A, 54B, 54C and 54D. Each row 54A, 54B, 54C and 54D has four antenna elements 54. The arrangement direction of the plurality of rows 54A, 54B, 54C and 54D is a direction (the y direction) obtained by projecting the fourth direction D4 in which the fourth beam is directed, onto the horizontal plane (the xy plane). When the phase is adjusted for each of the plurality of rows 54A, 54B, 54C and 54D, beam forming in which the direction of the fourth beam at the vertical plane is changed can be performed.

In the second embodiment, since the number of antenna elements forming each antenna element group is large, the gain can be increased. In addition, since the number of antenna elements is large, the beam becomes sharp, and the beam width is reduced. Accordingly, the effect of beam forming is more enhanced. In addition, when the phase is adjusted for each of the plurality of rows of antenna elements, the direction of the beam toward the communication counterpart such as the base station 300 can be changed at the vertical plane.

Third Embodiment

Figure 8:
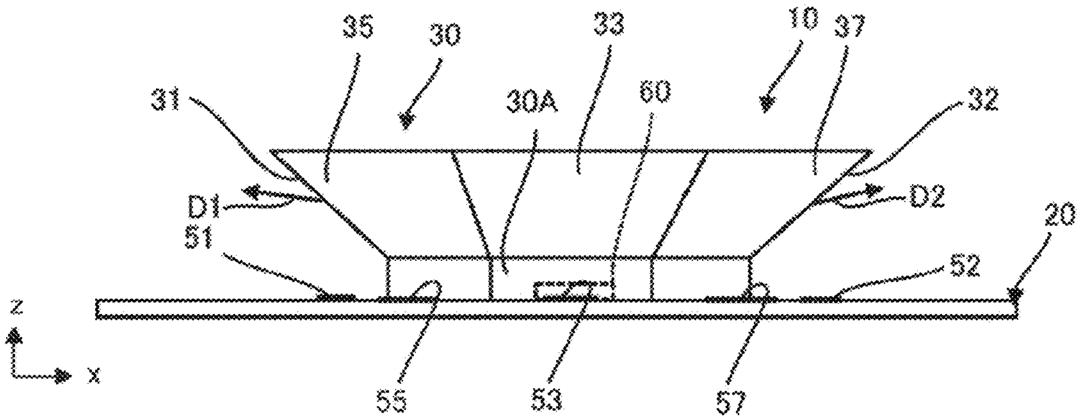
FIG. 8 is a side view of an antenna device according to a third embodiment.
Figure 9:
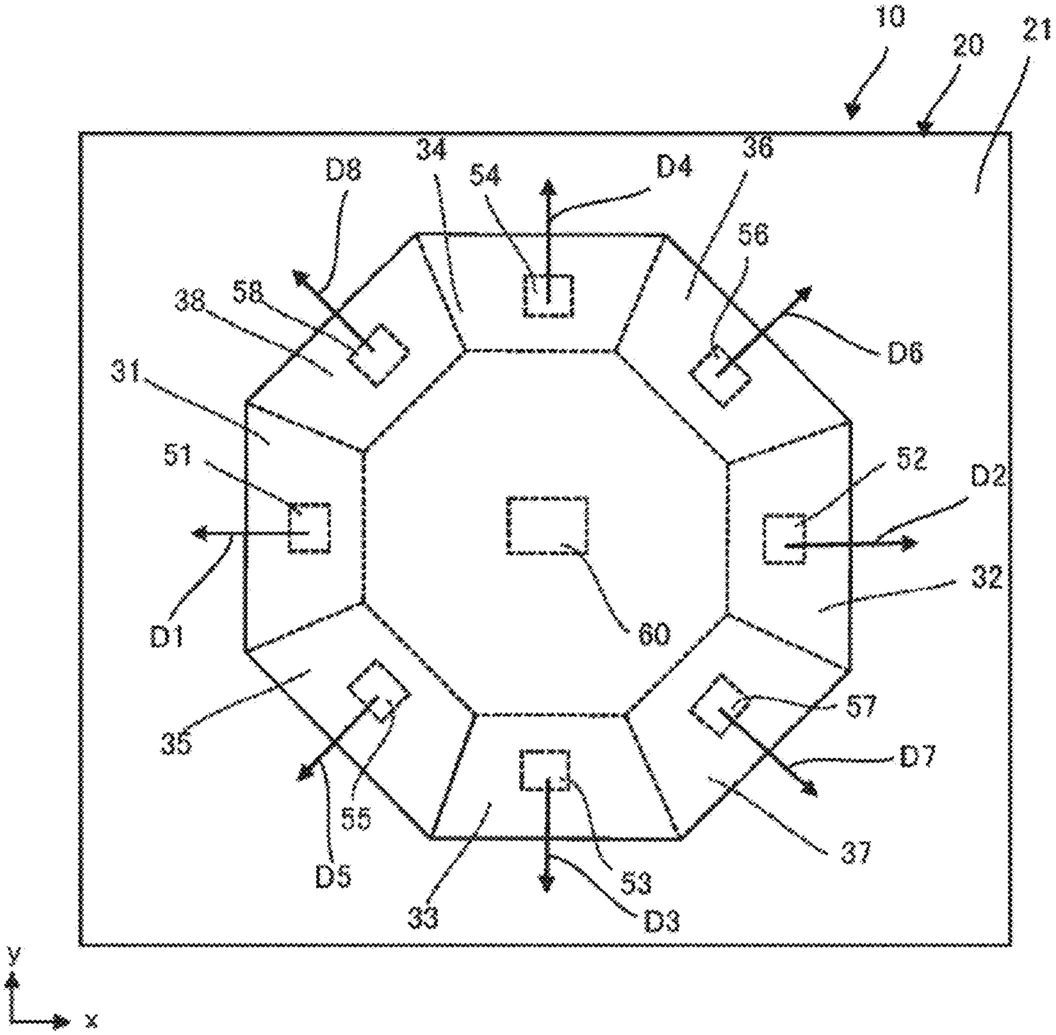
FIG. 9 is a plan view of the antenna device according to the third embodiment.

FIG. 8 and FIG. 9 each show an antenna device 10, for a mobile body, according to a third embodiment. In the third embodiment, the antenna 50 has eight antenna element groups. A first group is composed of one first antenna element 51. A second group is composed of one second antenna element 52. A third group is composed of one third antenna element 53. A fourth group is composed of one fourth antenna element 54. A fifth group is composed of one fifth antenna element 55. A sixth group is composed of one sixth antenna element 56. A seventh group is composed of one seventh antenna element 57. An eighth group is composed of one eighth antenna element 58. That is, the antenna 50 of the third embodiment has eight antenna elements 51, 52, 53, 54, 55, 56, 57 and 58.

The eight antenna elements 51, 52, 53, 54, 55, 56, 57 and 58 are disposed in a polygonal peripheral shape (octagonal peripheral shape). That is, the first group of the first antenna element 51 forms a first side of the octagon. The second group of the second antenna element 52 forms a second side, which is the opposing side of the first side. Further, the third group of the third antenna element 53 forms a third side, and the fourth group of the fourth antenna element 54 forms a fourth side, which is the opposing side of the third side. The fifth group of the fifth antenna element 55 forms a fifth side, and the sixth group of the sixth antenna element 56 forms a sixth side, which is the opposing side of the fifth side. The seventh group of the seventh antenna element 57 forms a seventh side, and the eighth group of the eighth antenna element 58 forms an eighth side, which is the opposing side of the seventh side.

The reflector 30 includes a base part 30A having an octagonal shape, and reflection surfaces 31, 32, 33, 34, 35, 36, 37 and 38. The reflection surfaces have a plurality of reflection regions 31, 32, 33, 34, 35, 36, 37 and 38 that are extended obliquely upward from the respective eight sides of the base part 30A having an octagonal shape. The shown reflection regions 31, 32, 33, 34, 35, 36, 37 and 38 are disposed so as to form eight pyramidal faces of a truncated octangular pyramid. The truncated octangular pyramid here is an inverted truncated octangular pyramid in which the bottom surface that has a smaller area is on the lower side and the bottom surface that has a larger area is on the upper side. The inside of the reflector 30 is hollow.

The plurality of reflection regions 31, 32, 33, 34, 35, 36, 37 and 38 include a first reflection region (first reflection surface) 31, a second reflection region (second reflection surface) 32, a third reflection region (third reflection surface) 33, a fourth reflection region (fourth reflection surface) 34, a fifth reflection region (fifth reflection surface) 35, a sixth reflection region (sixth reflection surface) 36, a seventh reflection region (seventh reflection surface) 37, and an eighth reflection region (eighth reflection surface) 38.

The first reflection region 31 is positioned above the first antenna element 51 and directs the beam of the first antenna element 51 toward the first direction D1. The second reflection region 32 is positioned above the second antenna element 52 and directs the beam of the second antenna element 52 toward the second direction D2. The third reflection region 33 is positioned above the third antenna element 53 and directs the beam of the third antenna element 53 toward the third direction D3. The fourth reflection region 34 is positioned above the fourth antenna element 54 and directs the beam of the fourth antenna element 54 toward the fourth direction D4.

The fifth reflection region 35 is positioned above the fifth antenna element 55 and directs the beam of the fifth antenna element 55 toward a fifth direction D5. The sixth reflection region 36 is positioned above the sixth antenna element 56 and directs the beam of the sixth antenna element 56 toward a sixth direction D6. The seventh reflection region 37 is positioned above the seventh antenna element 57 and directs the beam of the seventh antenna element 57 toward a seventh direction D7. The eighth reflection region 38 is positioned above the eighth antenna element 58 and directs the beam of the eighth antenna element 58 toward an eighth direction D8.

In the third embodiment, a selector for 8-port switching, which replaces the selector 80 for 4-port switching shown in FIG. 4, is used. The 8-port switching selector connects the transmitter-receiver 90 to any one of the eight antenna elements 51, 52, 53, 54, 55, 56, 57 and 58. Accordingly, the beam can be directed toward any one of the eight directions D1, D2, D3, D4, D5, D6, D7 and D8, and the directivity in all directions can be efficiently ensured.

The third embodiment adopts a configuration in which the beam can be directed to more directions than in the first embodiment. Therefore, even when beam forming at the horizontal plane is not performed, directivity in all directions at the horizontal plane can be easily ensured.

Fourth Embodiment

Figure 10:
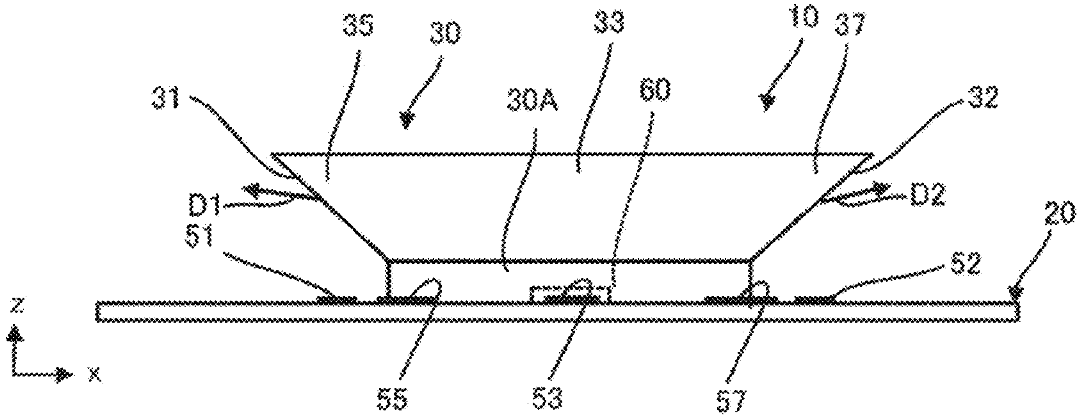
FIG. 10 is a side view of an antenna device according to a fourth embodiment.
Figure 11:
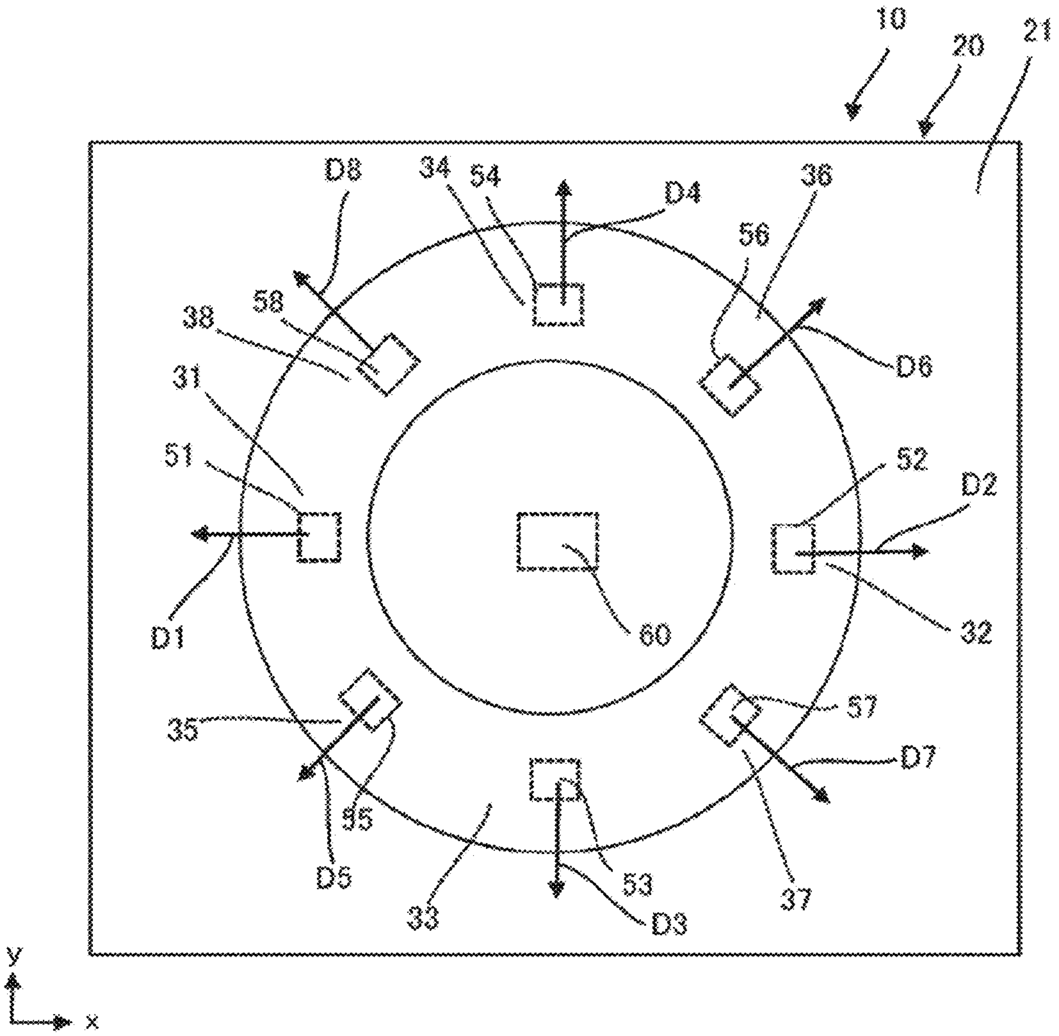
FIG. 11 is a plan view of the antenna device according to the fourth embodiment.

FIG. 10 and FIG. 11 each show an antenna device 10, for a mobile body, according to a fourth embodiment. The antenna 50 of the fourth embodiment is similar to the antenna 50 of the third embodiment. The reflector 30 of the fourth embodiment includes a base part 30A having a cylindrical shape and reflection surfaces 31, 32, 33, 34, 35, 36, 37 and 38. The reflection surfaces form a conic face of an inverted truncated cone.

Also, in the fourth embodiment, similar to the third embodiment, the reflector 30 has eight reflection regions 31, 32, 33, 34, 35, 36, 37 and 38. However, there are no clear boundaries between the reflection regions 31, 32, 33, 34, 35, 36, 37 and 38.

In the fourth embodiment, the first reflection region 31 is a region positioned above the first antenna element 51 and directs the beam of the first antenna element 51 toward the first direction D1. The second reflection region 32 is a region positioned above the second antenna element 52 and directs the beam of the second antenna element 52 toward the second direction D2. The third reflection region 33 is a region positioned above the third antenna element 53 and directs the beam of the third antenna element 53 toward the third direction D3. The fourth reflection region 34 is a region positioned above the fourth antenna element 54 and directs the beam of the fourth antenna element 54 toward the fourth direction D4.

The fifth reflection region 35 is a region positioned above the fifth antenna element 55 and directs the beam of the fifth antenna element 55 toward the fifth direction D5. The sixth reflection region 36 is a region positioned above the sixth antenna element 56 and directs the beam of the sixth antenna element 56 toward the sixth direction D6. The seventh reflection region 37 is a region positioned above the seventh antenna element 57 and directs the beam of the seventh antenna element 57 toward the seventh direction D7. The eighth reflection region 38 is a region positioned above the eighth antenna element 58 and directs the beam of the eighth antenna element 58 toward the eighth direction D8. When the reflection surface has a conical shape as in the fourth embodiment, the antenna elements can be disposed at any positions below the reflection surface. Therefore, this configuration is advantageous when a large number of antenna elements are desired to be provided.

Fifth Embodiment

Figure 12:
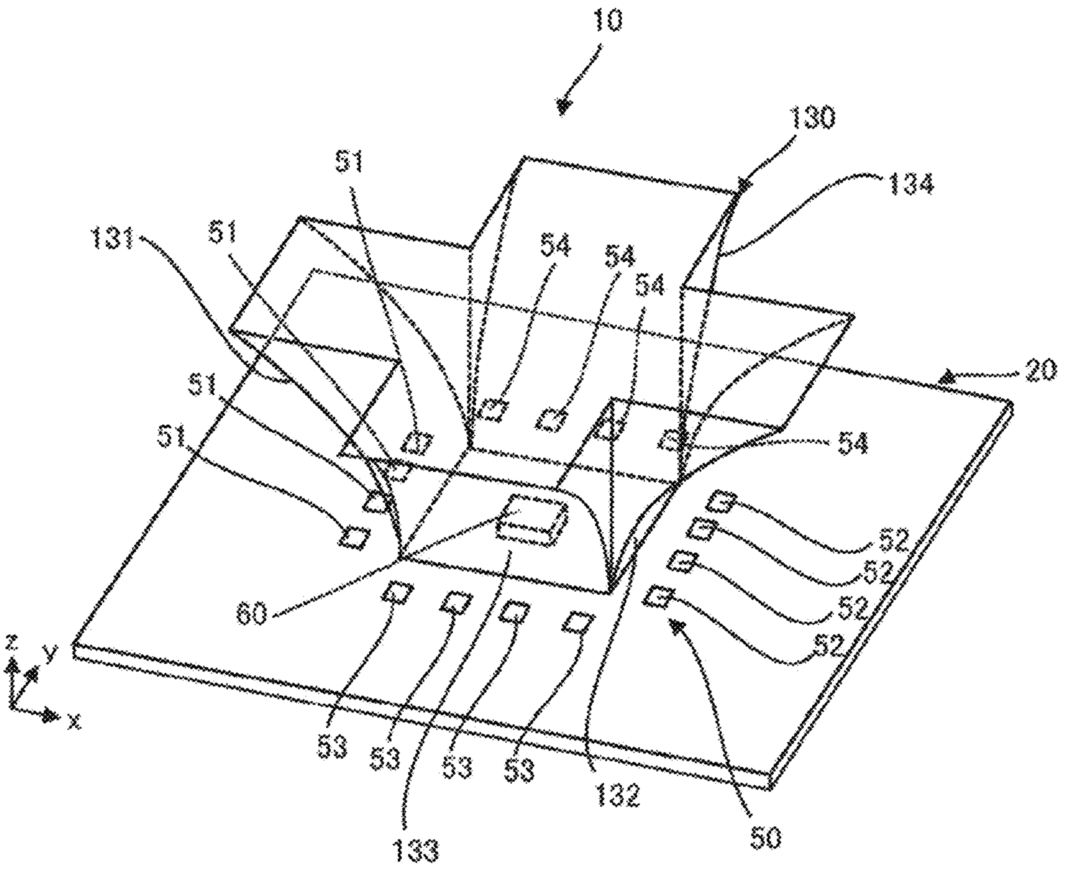
FIG. 12 is a perspective view of an antenna device according to a fifth embodiment.
Figure 13:
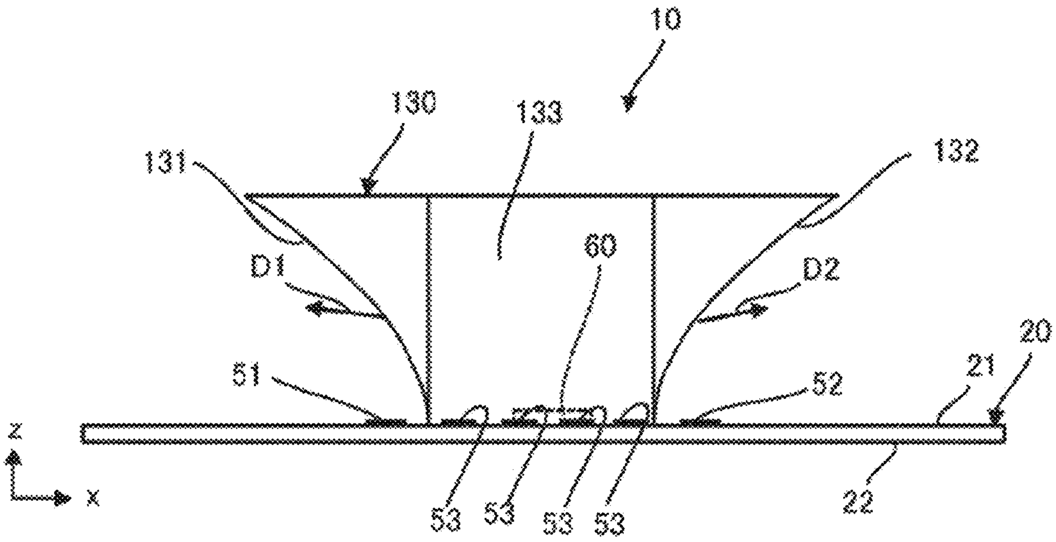
FIG. 13 is a side view of the antenna device according to the fifth embodiment.
Figure 14:
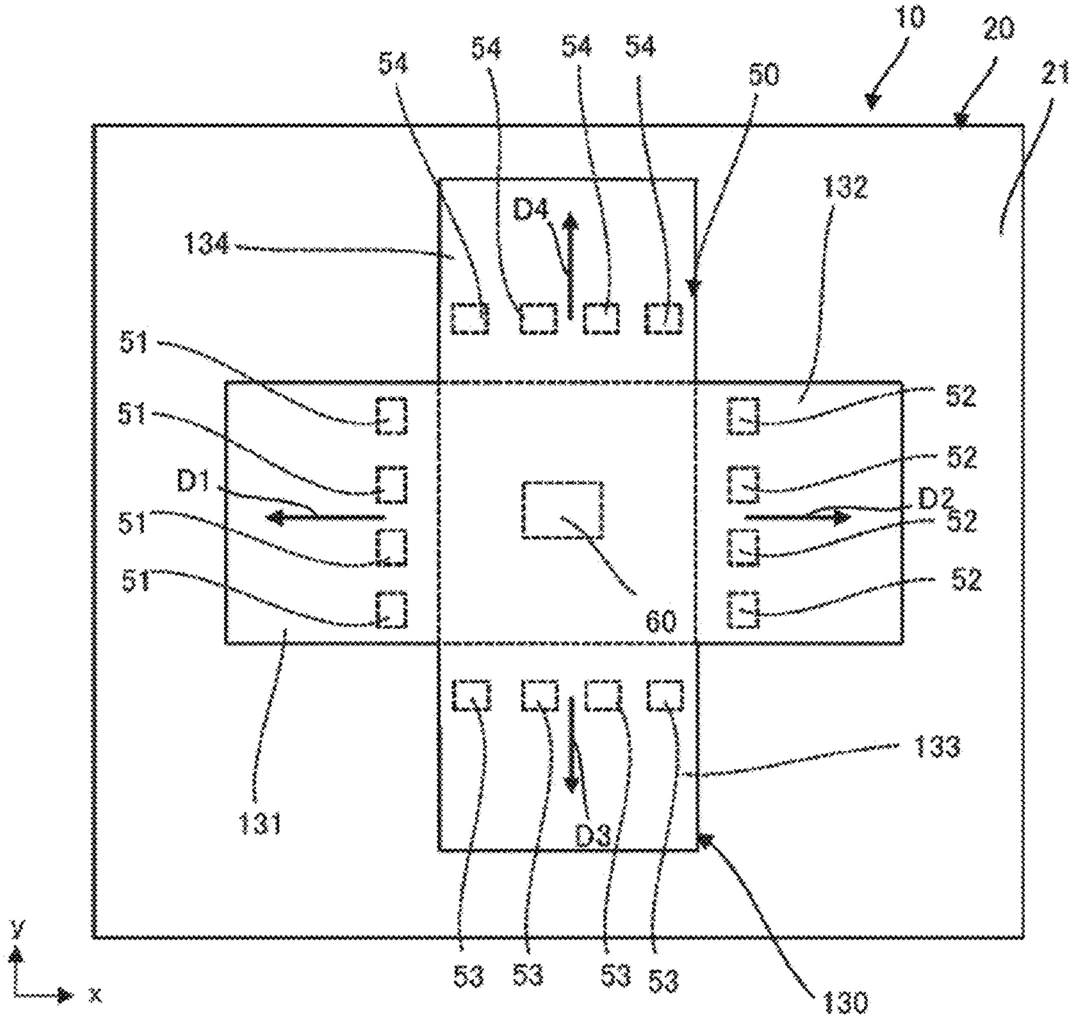
FIG. 14 is a plan view of the antenna device according to the fifth embodiment.

FIG. 12, FIG. 13, and FIG. 14 each show an antenna device 10, for a mobile body, according to a fifth embodiment. The antenna 50 of the fifth embodiment is similar to the antenna 50 of the first embodiment. A reflector 130 of the fifth embodiment also has four reflection regions 131, 132, 133 and 134, similar to the reflector 30 of the first embodiment. However, the reflection region 31, 32, 33 and 34 of the first embodiment is a flat surface, whereas the reflection region 131, 132, 133 and 134 of the fifth embodiment is a concave curved surface (concave curved surface region), and more specifically, a parabolic curved surface (parabolic curved surface region).

It is sufficient that the concave curved surface of the embodiment is not a flat surface, and the shape thereof is not limited in particular. In the parabolic curved surface of the embodiment, the cross-sectional shape at an orthogonal plane with respect to the surface 21 (the xy plane) provided with the antenna 50 has a parabola. In the parabolic curved surface of the embodiment, the cross-sectional shape at a plane (the xy plane) parallel to the surface 21 has a straight line. Preferably, the direction in which the straight line extends is parallel to the array direction of the plurality of antenna elements for which the beam directions are changed by the parabolic curved surface. In FIG. 12, FIG. 13, and FIG. 14, the orthogonal plane with respect to the surface 21 (the xy plane) is the yz plane or the zx plane.

For example, with respect to the shown reflection region 131 and 132, the cross-sectional shape at the zx plane, which is an orthogonal plane, is a parabola, and the cross-sectional shape at the xy plane, which is a plane parallel to the surface 21 is a straight line. The straight line of the cross-sectional shape of the reflection region 131 and 132 is parallel to the array direction (the y direction) of the plurality of antenna elements 51 and 52.

With respect to the reflection region 133 and 134, the cross-sectional shape at the yz plane, which is an orthogonal plane, is a parabola, and the cross-sectional shape at the xy plane, which is a plane parallel to the surface 21, is a straight line. The straight line of the cross-sectional shape of the reflection region 133 and 134 is parallel to the array direction (the x direction) of the plurality of antenna elements 53 and 54.

Since the reflection region 131, 132, 133 and 134 has a straight line as the cross-sectional shape at the xy plane, which is the horizontal plane, even when the beam directions are changed, change in the characteristics at the horizontal plane can be suppressed.

Since the reflection region 131, 132, 133 and 134 is in the form of a concave curved surface, the beam can be concentrated to a direction D1, D2, D3 and D4 to which the beam is desired to be directed. Accordingly, the gain can be increased. In addition, when the reflection region 131, 132, 133 and 134 is in the form of a parabolic curved surface, the beam can be more concentrated to a direction D1, D2, D3 and D4 to which the beam is desired to be directed. Accordingly, the gain can be more increased.

The antenna elements 51, 52, 53 and 54 are each disposed at the focal position of the parabola of the parabolic curved surface or in the vicinity of the focal position. That is, each first antenna element 51 is disposed at the focal position or in the vicinity of the focal position of the first reflection region 131, which is a parabolic curved surface. Each second antenna element 52 is disposed at the focal position or in the vicinity of the focal position of the second reflection region 132, which is a parabolic curved surface. Each third antenna element 53 is disposed at the focal position or in the vicinity of the focal position of the third reflection region 133, which is a parabolic curved surface. Each fourth antenna element 54 is disposed at the focal position or in the vicinity of the focal position of the fourth reflection region 134, which is a parabolic curved surface.

Sixth Embodiment

Figure 15:
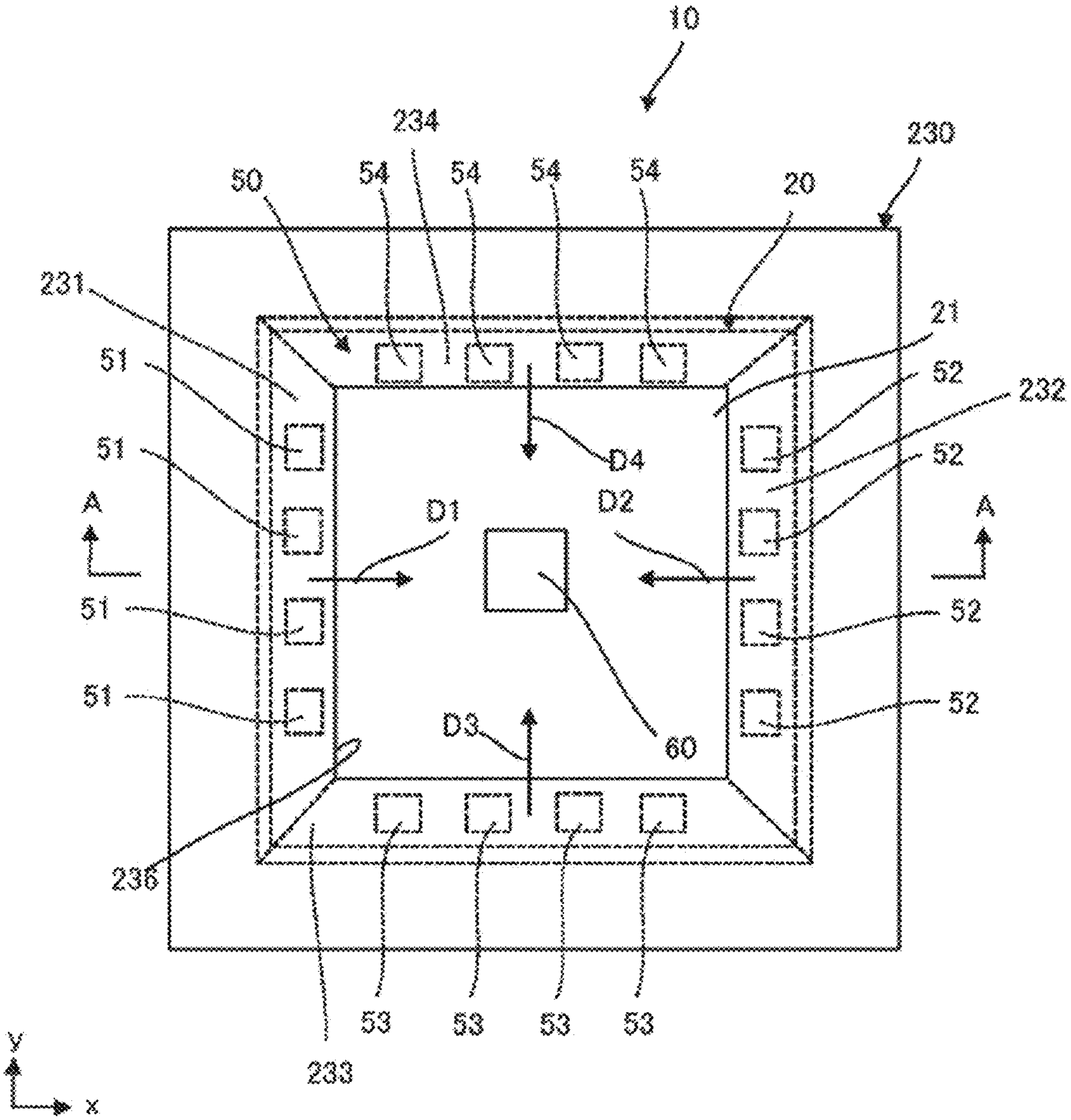
FIG. 15 is a plan view of an antenna device according to a sixth embodiment.
Figure 16:
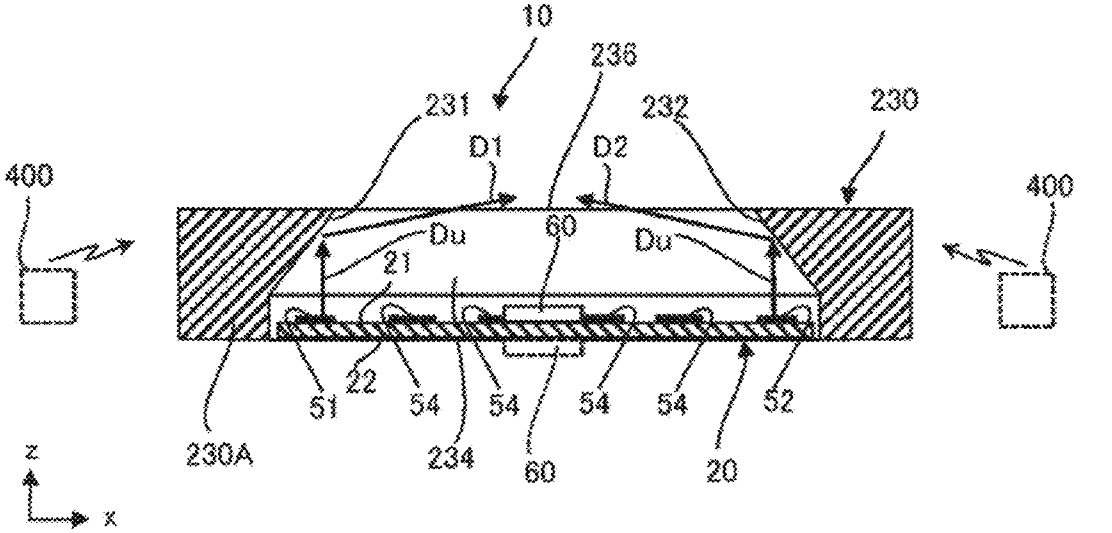
FIG. 16 is a cross-sectional view along an A-A line in FIG. 15.

FIG. 15 and FIG. 16 each show an antenna device 10, for a mobile body, according to a sixth embodiment. The antenna 50 of the sixth embodiment is similar to the antenna 50 of the first embodiment. A reflector 230 of the sixth embodiment is provided so as to stand outside the region (rectangular region) surrounded by the plurality of antenna elements 51, 52, 53 and 54. In other words, the plurality of antenna elements 51, 52, 53 and 54 are disposed in the internal space of the reflector 230.

The reflector 230 includes a base part 230A disposed around the substrate 20 forming the antenna 50, and reflection surfaces (reflection regions) 231, 232, 233 and 234 provided above the base part 230A. The base part 230A is formed as a frame body having a rectangular shape surrounding the substrate 20, and has an opening 236 in an upper part. The reflection surfaces have a plurality of reflection regions 231, 232, 233 and 234 that are extended obliquely upward from the respective four sides of the base part 230A having a rectangular shape. The shown reflection regions 231, 232, 233 and 234 are flat surfaces, respectively, and are disposed so as to form four pyramidal faces of a truncated quadrangular pyramid. As for the truncated quadrangular pyramid here, the bottom surface that has a larger area is on the lower side, and the bottom surface that has a smaller area is on the upper side.

The plurality of reflection regions 231, 232, 233 and 234 include a first reflection region (first reflection surface) 231. As shown in FIG. 16, the first reflection region 231 is inwardly inclined so as to be positioned above each first antenna element 51. The first reflection region 231 directs a first beam in the upward direction Du generated from the first antenna element 51, toward the first direction D1. The first beam advances to the outside of the reflector 230 through the opening 236. The first direction D1 is in the +x direction as shown in FIG. 15.

The plurality of reflection regions 231, 232, 233 and 234 include a second reflection region (second reflection surface) 232. The second reflection region 232 is positioned above each second antenna element 52. The second reflection region 232 directs a second beam in the upward direction Du generated from the second antenna element 52, toward the second direction D2. The second beam advances to the outside of the reflector 230 through the opening 236. The second direction D2 is in the −x direction as shown in FIG. 15.

The plurality of reflection regions 231, 232, 233 and 234 include a third reflection region (third reflection surface) 233. The third reflection region 233 is positioned above each third antenna element 53. The third reflection region 233 directs a third beam in the upward direction Du generated from the third antenna element 53, toward the third direction D3. The third beam advances to the outside of the reflector 230 through the opening 236. The third direction D3 is in the +y direction as shown in FIG. 15.

The plurality of reflection regions 231, 232, 233 and 234 include a fourth reflection region (fourth reflection surface) 234. The fourth reflection region 234 is positioned above each fourth antenna element 54. The fourth reflection region 234 directs a fourth beam in the upward direction Du generated from the fourth antenna element 54, toward the fourth direction D4. The fourth beam advances to the outside of the reflector 230 through the opening 236. The fourth direction D4 is in the −y direction as shown in FIG. 15.

In the sixth embodiment, similar to the first embodiment and the like, beams respectively directed to the plurality of directions D1, D2, D3 and D4 are obtained due to the reflector 230. In the sixth embodiment, even when a noise source (e.g., an external device) 400 is present in a space outside the reflector 230, interference to the antenna 50 by the noise source 400 can be prevented. That is, the reflector 230 not only reflects the beams but also functions as a shield against noise. Accordingly, noise resistance is improved.

In the sixth embodiment, elements (integrated circuit, etc.) of the wireless circuit 60 may be provided at the upper surface 21 of the substrate 20, but may be provided at the lower surface 22 of the substrate 20, as in the case of the wireless circuit 60 indicated by a dotted line in FIG. 16. In this case, interference between the wireless circuit 60 and the antenna 50 can be prevented.

ADDITIONAL NOTE

It should be noted that the embodiments disclosed herein are merely illustrative and not restrictive in all aspects. The scope of the present invention is defined by the scope of the claims rather than the above description, and is intended to include meaning equivalent to the scope of the claims and all modifications within the scope.

REFERENCE SIGNS LIST

10 antenna device
20 substrate
21 upper surface
22 lower surface
25 reflector outer region
26 reflector inner region
30 reflector
30A base part
31 first reflection region
32 second reflection region
33 third reflection region
34 fourth reflection region
35 fifth reflection region
36 sixth reflection region
37 seventh reflection region
38 eighth reflection region
50 antenna
51 first antenna element
51A row
51B row
51C row
51D row
52 second antenna element
52A row
52B row
52C row
52D row
53 third antenna element
53A row
53B row
53C row
53D row
54 fourth antenna element
54A row
54B row
54C row
54D row
55 fifth antenna element
56 sixth antenna element
57 seventh antenna element
58 eighth antenna element
60 wireless circuit
70 4-distribution phase shifter
71 phase shifter
72 4-distributor
80 selector
90 transmitter-receiver
100 communication device
130 reflector
131 reflection region

132 reflection region
133 reflection region
134 reflection region
200 vehicle
210 roof
220 recess
230 reflector
230A base part
231 first reflection region
232 second reflection region
233 third reflection region
234 fourth reflection region
236 opening
300 base station
400 noise source
D1 first direction
D2 second direction
D3 third direction
D4 fourth direction
D5 fifth direction
D6 sixth direction
D7 seventh direction
D8 eighth direction
Du upward direction
H horizontal direction

The invention claimed is:

1. An antenna device, for a mobile body, comprising:
an antenna configured to be installed in the mobile body; and
a reflector having a reflection surface configured to change a beam direction of the antenna,
wherein the antenna includes
a plurality of first antenna elements configured to generate a first beam, and
a plurality of second antenna elements configured to generate a second beam, and
the reflection surface includes a first reflection region configured to direct the first beam toward a first direction, and
a second reflection region configured to direct the second beam toward a second direction different from the first direction, and
the first antenna elements and the second antenna elements are disposed such that the first beam and the second beam are directed toward a same direction between the antenna and the reflector,
the plurality of first antenna elements are disposed in a row in a direction parallel to the first reflection region, and
the plurality of second antenna elements are disposed in a row in a direction parallel to the second reflection region.

2. The antenna device, for the mobile body, according to claim 1, wherein the first antenna elements and the second antenna elements are provided at a same base member.

3. The antenna device, for the mobile body, according to claim 2, wherein the first antenna elements and the second antenna elements are provided at a same surface of the base member.

4. The antenna device, for the mobile body, according to claim 2, wherein the first antenna elements and the second antenna elements are provided at a same flat surface of the base member.

5. The antenna device, for the mobile body, according to claim 1, wherein the first antenna elements and the second antenna elements are disposed such that the first beam and the second beam are directed toward an upward direction between the antenna and the reflector, and the first direction and the second direction are each a direction inclined closer to a horizontal direction than to the upward direction.

6. The antenna device, for the mobile body, according to claim 5, wherein the first direction and the second direction are each a direction between the horizontal direction and the upward direction.

7. The antenna device, for the mobile body, according to claim 1, wherein the first direction and the second direction are different directions at a horizontal plane.

8. The antenna device, for the mobile body, according to claim 1, wherein angles of the first direction and the second direction with respect to a horizontal plane are equivalent to each other.

9. The antenna device, for the mobile body, according to claim 1, wherein the reflection surface has a concave curved surface region.

10. The antenna device, for the mobile body, according to claim 9, wherein
the reflection surface has a parabolic curved surface region, and
in the parabolic curved surface region, a cross-sectional shape at an orthogonal plane with respect to a surface provided with the antenna is a parabola, and a cross-sectional shape at a plane parallel to the surface provided with the antenna is a straight line.

11. The antenna device, for the mobile body, according to claim 1, wherein
the antenna and the reflector are provided at a base member, and
the base member is provided with a wireless circuit configured to be connected to the antenna.

12. The antenna device, for the mobile body, according to claim 11, wherein
the reflector has an internal space, and
the wireless circuit is disposed in the internal space.

13. A communication device comprising:
an antenna configured to be installed in a mobile body;
a reflector having a reflection surface configured to change a beam direction of the antenna; and
a wireless circuit configured to be connected to the antenna,
wherein the antenna includes
a plurality of first antenna elements configured to generate a first beam, and
a plurality of second antenna elements configured to generate a second beam, and
the reflection surface includes
a first reflection region configured to direct the first beam toward a first direction, and
a second reflection region configured to direct the second beam toward a second direction different from the first direction, and
the first antenna elements and the second antenna elements are disposed such that the first beam and the second beam are directed toward a same direction between the antenna and the reflector,
the plurality of first antenna elements are disposed in a row in a direction parallel to the first reflection region, and
the plurality of second antenna elements are disposed in a row in a direction parallel to the second reflection region.

* * * * *